L. WILLIS.
CLUTCH MECHANISM FOR AGRICULTURAL IMPLEMENTS.
APPLICATION FILED FEB. 25, 1909.
981,343.
Patented Jan. 10, 1911.
2 SHEETS—SHEET 1.
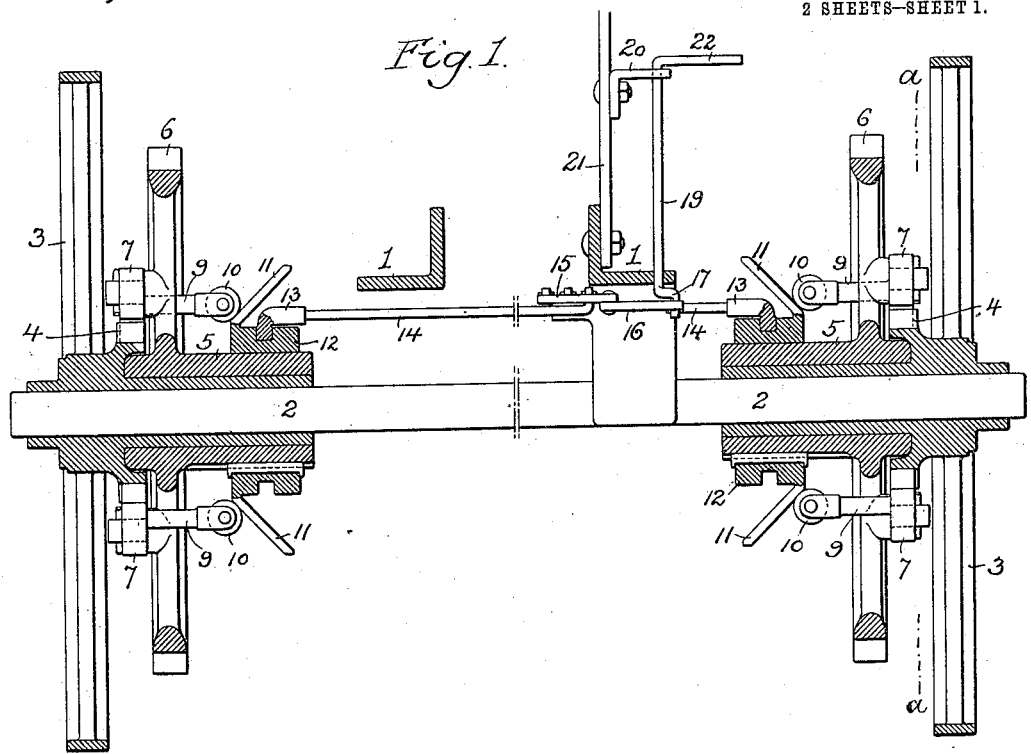
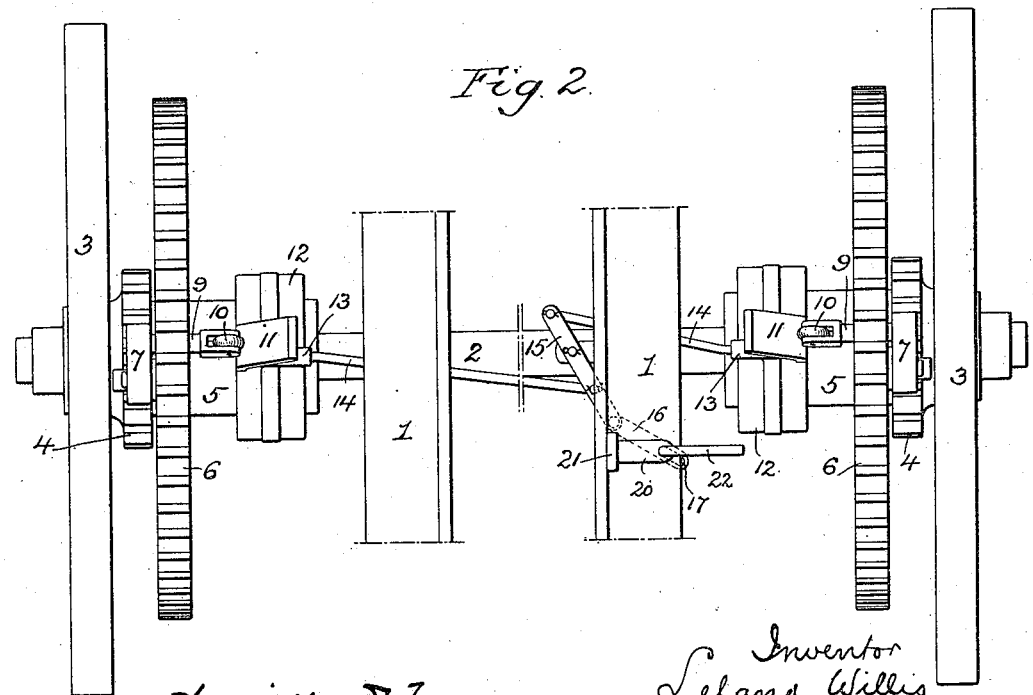

L. WILLIS.
CLUTCH MECHANISM FOR AGRICULTURAL IMPLEMENTS.
APPLICATION FILED FEB. 25, 1909.

981,343.

Patented Jan. 10, 1911.

2 SHEETS—SHEET 2.

Witnesses
Hamilton T. Turner
Harry L. Smith

Inventor
Leland Willis
by his Attorneys

UNITED STATES PATENT OFFICE.

LELAND WILLIS, OF GRENLOCH, NEW JERSEY, ASSIGNOR TO BATEMAN MANUFACTURING COMPANY, OF GRENLOCH, NEW JERSEY, A CORPORATION OF NEW JERSEY.

CLUTCH MECHANISM FOR AGRICULTURAL IMPLEMENTS.

981,343. Specification of Letters Patent. Patented Jan. 10, 1911.

Application filed February 25, 1909. Serial No. 479,899.

*To all whom it may concern:*

Be it known that I, LELAND WILLIS, a citizen of the United States, residing in Grenloch, New Jersey, have invented certain Improvements in Clutch Mechanism for Agricultural Implements, of which the following is a specification.

The object of my invention is to provide simple, effective and cheap devices for clutching the traction wheel of an agricultural implement to and releasing it from the operating devices of the machine, and for simultaneously clutching both traction wheels to or releasing them from such operating mechanism.

Figure 3:
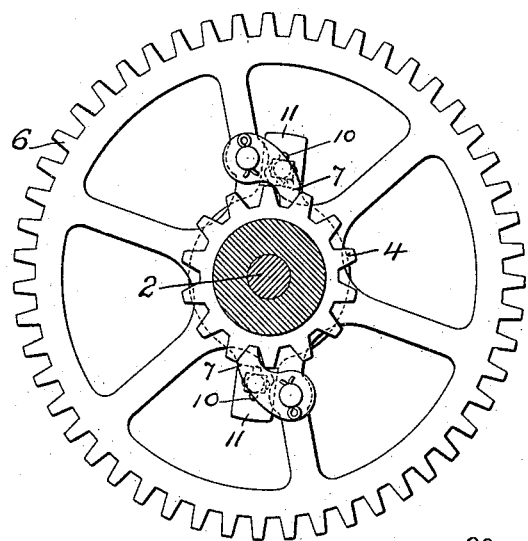
Figure 4:
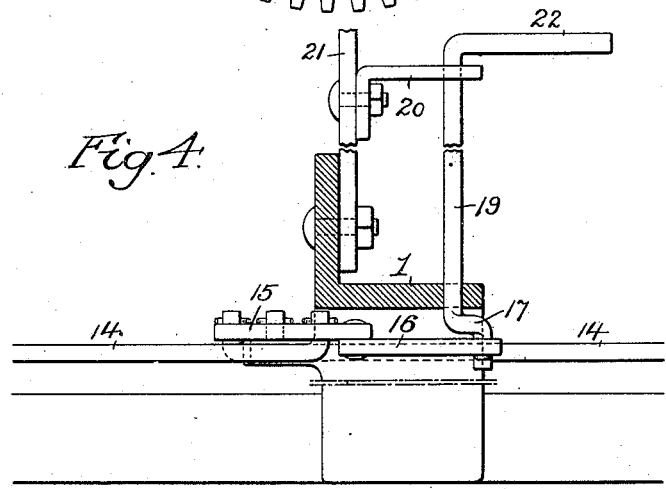
Figure 5:
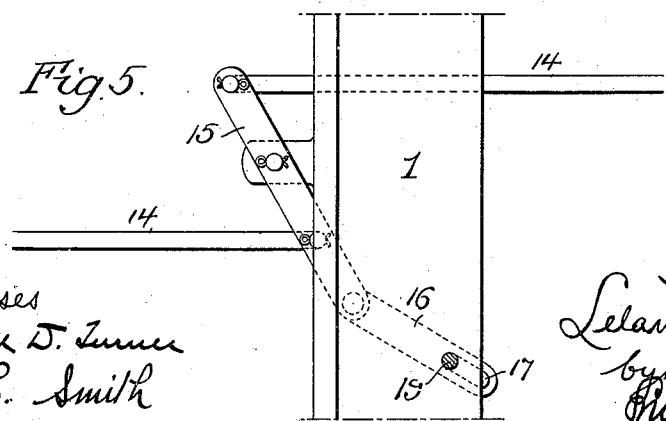

In the accompanying drawings—Figure 1 is a view, partly in elevation and partly in vertical transverse section, of sufficient of the machine to illustrate those parts to which my invention relates; Fig. 2 is a plan or top view of the same; Fig. 3 is a section on the line *a—a*, Fig. 1, and Figs. 4 and 5 are enlarged views of certain portions of the mechanism.

In the drawings, 1—1 represent bars constituting part of the fixed framework of the machine, these bars being suitably mounted upon a fixed transverse axle 2 which is supported by the hubs of the traction wheels 3, the latter turning loosely upon said axle.

Secured to or forming part of the hub of each traction wheel 3 is a toothed wheel 4, which, for convenience, I will term a "ratchet" wheel, and mounted so as to be free to turn upon each traction wheel hub is the hub 5 of a spur wheel 6, power being transmitted to the operating parts of the machine from said spur wheels, by any suitable means.

Hung to spokes of each of the spur wheels 6 are a pair of pawls 7, which are normally held in engagement with the corresponding ratchet wheel 4 by means of springs (not shown) whereby the rotation of each of the traction wheels 3 is transmitted to its corresponding spur wheel 6 and thence to the operating parts of the machine.

Each of the pawls 7 has an inwardly projecting arm 9 carrying at its inner end a roller 10, these rollers normally resting upon inclined arms 11 projecting from the opposite sides of a sleeve 12, the latter being free to slide on the hub 5 of the corresponding spur wheel, but being splined or otherwise connected to said hub so as to be caused to rotate therewith, the object of this construction being to save material as compared with the use of a continuous annular flange on the sleeve. If such annular flange was employed the spline connection could be dispensed with.

When the sleeves 12 are retracted, as shown in Fig. 1, the pawls are permitted to swing into engagement with their corresponding ratchet wheels 4, and power is transmitted from the traction wheels 3 to the spur wheels 6, but when the slides 12 are projected or moved toward the spur wheels 6 their inclined arms 11 will act upon the rollers 10 so as to lift the pawls 7 free from engagement with the teeth of the ratchet wheels and thereby disconnect the traction wheels 3 and spur wheels 6 and discontinue the application of power to the operative parts of the machine. If, however, the sleeves 12 are operated independently, the machine will have to be stopped whenever the traction wheels and spur wheels have to be connected or disconnected from one another and the attendant must leave his seat in order to independently move the controlling sleeves 12. One of the features of my invention, therefore, consists in providing means for so connecting the sleeves 12 with a single operating device that the latter can be readily manipulated by the attendant without the necessity of stopping the machine or leaving his seat.

Each of the sleeves 12 is grooved for the reception of a forked shifter 13 having a rod 14, one of these rods being connected to one arm of a lever 15 and the other to the opposite arm of the same, said lever being pivotally mounted upon a lug or bracket on the fixed frame 1 of the machine, and one arm of the lever being also connected by a link 16 to a crank 17 at the lower end of a vertical shaft 19, the latter being free to turn in a bearing on one of the frames 1 and in a bearing in a bracket 20 projecting from a vertical bar 21 of said frame, the upper end of the shaft 19 being bent so as to form an operating handle 22, as shown in Fig. 1, this handle being within convenient reach of the attendant. By manipulating the handle 22, therefore, the attendant can instantly project or retract the sleeves 12 and thereby raise or lower the pawls 7 of both spur wheels 6, in order to throw said wheels into or out of operative connection with their respective traction wheels when it is desired to start or stop the operative mechanism of the machine.

I claim:

1. The combination of a traction wheel of the machine, a spur wheel mounted to rotate on the hub of said traction wheel, a ratchet wheel on said hub, a pawl carried by the spur wheel and having an arm projecting from one side of the same, and a slide having an inclined wing for acting on said arm to lift the pawl out of engagement with the teeth of the ratchet wheel.

2. The combination of a traction wheel of the machine, a spur wheel mounted to rotate on the hub of said traction wheel, a ratchet wheel on said hub, a pawl carried by the spur wheel and having an arm projecting from one side of the same, and a sleeve having an inclined wing for acting on said arm to lift the pawl out of engagement with the teeth of the ratchet wheel, said sleeve turning with the hub of the spur wheel but free to slide thereon.

3. The combination of the traction wheels of the machine, oppositely located spur gears each having pawl connection with its respective traction wheel, slides each having an inclined wing for acting upon the pawl of its respective spur gear, a lever having one arm connected to one of said slides and the other arm to the opposite slide, a crank shaft, and a link connecting the crank of said shaft to said lever.

In testimony whereof, I have signed my name to this specification, in the presence of two subscribing witnesses.

LELAND WILLIS.

Witnesses:
O. P. NEWCOMB,
E. E. WILSON.